(No Model.)

C. L. COFFIN.
ELECTRICAL SOLDERING IRON.

No. 488,871. Patented Dec. 27, 1892.

WITNESSES
Geo H Lothrop
Gertrude H. Anderson

INVENTOR
Charles L. Coffin

UNITED STATES PATENT OFFICE.

CHARLES L. COFFIN, OF DETROIT, MICHIGAN.

ELECTRICAL SOLDERING-IRON.

SPECIFICATION forming part of Letters Patent No. 488,871, dated December 27, 1892.

Application filed July 20, 1891. Serial No. 400,112. (No model.)

*To all whom it may concern:*

Be it known that I, CHARLES L. COFFIN, of Detroit, in the county of Wayne and State of Michigan, have invented a new and useful Improvement in Electric Soldering or Brazing Tools, of which the following is a specification.

My invention consists in an improvement in an electric soldering or brazing tool, hereinafter fully described and claimed.

Figure 1:
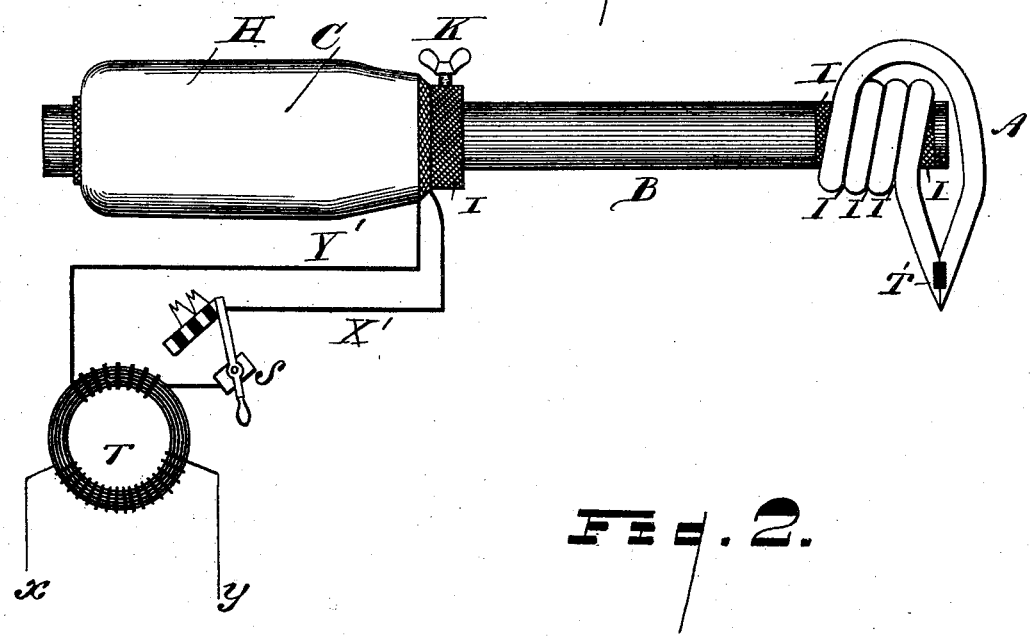
Figure 2:
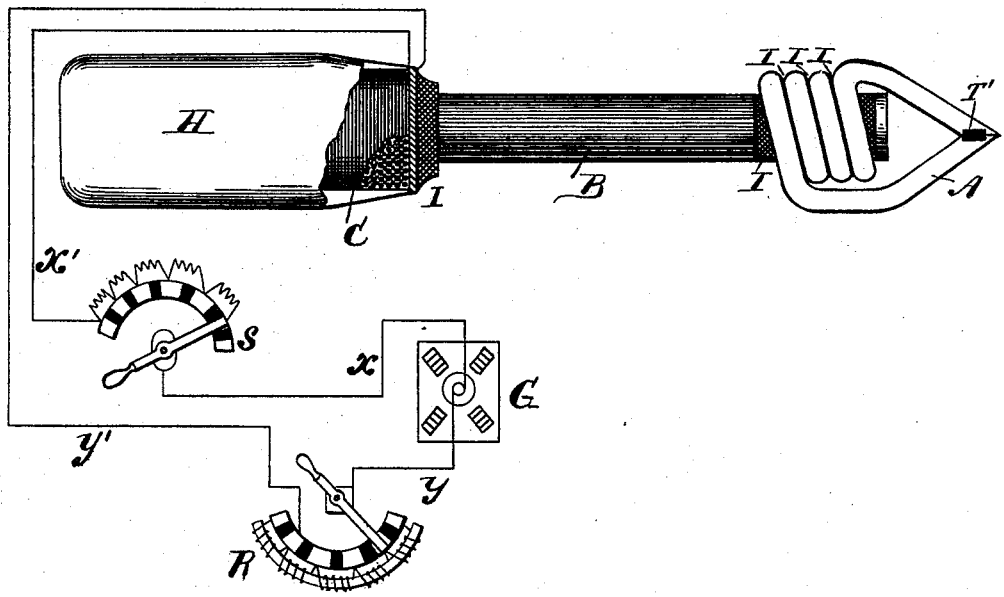

Figure 1 is a side elevation of the tool with a portion of the circuit including a transformer illustrated. Fig. 2 is a side elevation with a primary coil partly in section, and with governing appliances shown in the circuit.

B represents a core, preferably formed of a bundle of soft iron wires, or laminated iron, though it may be of soft iron if preferred.

A represents a soldering head of comparatively heavy iron or copper, coiled around core B, but insulated therefrom by suitable insulating material I.

C represents a coil of comparatively fine wire wound on insulating material I, and surrounding core B, the terminals of coil C being connected with a source of supplying electricity. The primary coil C is covered with insulating material H to adapt it to serve as a handle for the tool. It may also be adapted to slide along the core B, as in Fig. 1, and provided with a set screw K to hold it in any desired position, in order to regulate the strength of the current induced in the head A.

In Fig. 1, T represents a transformer for the purpose of changing the current of high voltage and low amprage to one of comparatively low voltage and high amprage, the conductors $x$ and $y$ leading from the transformer T to the poles of a generator of electricity. A resistance switch S interposed in the circuit X' and Y' of the primary coil C enables the resistance of the coil to be modified by the operator.

As illustrated in Fig. 2 G represents a generator whose poles are connected by the conductors $x$, $x'$ and $y$, $y'$ with the primary coil C, S represents a resistance switch on one of said conductors.

R represents a reaction rheostat on the other conductor, by means of which the inductive effect upon the secondary coil or soldering head A is regulated.

T', represents a block of material of high resistance, (carbon, iron, German silver, mica &c.) inserted in the end of the secondary coil or soldering head A, to increase the resistance thereof near the soldering point, and thus to increase the efficiency of the tool.

In the operation of my device an alternating current passing through primary coil C induces opposite currents in the secondary coil or head A, by which said coil or head becomes highly heated. This may be regulated either by moving the primary coil C on the core B, or by regulating the current, either by the resistance switch S, or by the rheostat R, or by two or more of these devices at the same time, as preferred.

What I claim as my invention and desire to secure by Letters Patent, is:—

In an electric soldering or brazing tool, in which the soldering or brazing head constitutes the secondary coil or circuit of an inductive apparatus, the combination of the secondary or soldering head, with a resistance material in circuit at or near the point of application of the head to the work, substantially as shown and described.

CHARLES L. COFFIN.

Witnesses:
CYRUS E. LOTHROP,
GERTRUDE H. ANDERSON,